US012642383B2

(12) United States Patent
Beekman et al.

(10) Patent No.: US 12,642,383 B2
(45) Date of Patent: Jun. 2, 2026

(54) COFFEE MACHINE

(71) Applicant: KONINKLIJKE PHILIPS N.V., Eindhoven (NL)

(72) Inventors: Jarno Beekman, Eindhoven (NL); Pieter Herman Klokman, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 942 days.

(21) Appl. No.: 17/789,489

(22) PCT Filed: Dec. 24, 2020

(86) PCT No.: PCT/EP2020/087848
§ 371 (c)(1),
(2) Date: Jun. 27, 2022

(87) PCT Pub. No.: WO2021/130354
PCT Pub. Date: Jul. 1, 2021

(65) Prior Publication Data
US 2023/0036962 A1 Feb. 2, 2023

(30) Foreign Application Priority Data
Dec. 27, 2019 (EP) ..................................... 19219835

(51) Int. Cl.
*A47J 31/06* (2006.01)
*A47J 31/36* (2006.01)
*A47J 31/42* (2006.01)

(52) U.S. Cl.
CPC ....... *A47J 31/0663* (2013.01); *A47J 31/3671* (2013.01); *A47J 31/42* (2013.01)

(58) Field of Classification Search
CPC ................ A47J 31/0663; A47J 31/3609; A47J 31/3614; A47J 31/3671; A47J 31/42
See application file for complete search history.

(56) References Cited

U.S. PATENT DOCUMENTS

| | | | | |
|---|---|---|---|---|
| 4,111,108 A | * | 9/1978 | Moser ................. | A47J 31/3619 99/289 R |
| 4,271,752 A | | 6/1981 | Valente et al. | |
| 5,144,886 A | * | 9/1992 | Gockelmann ......... | A47J 31/057 99/302 P |
| 5,526,733 A | | 6/1996 | Klawuhn et al. | |
| | | | (Continued) | |

FOREIGN PATENT DOCUMENTS

| | | |
|---|---|---|
| CH | 706100 A1 | 8/2013 |
| CN | 101232829 A | 7/2008 |
| | (Continued) | |

OTHER PUBLICATIONS

Extended European Search Report issued in connection with corresponding EP Application No. 19219835.6 dated Jun. 22, 2020.
(Continued)

*Primary Examiner* — Reginald Alexander
(74) *Attorney, Agent, or Firm* — Maschoff Brennan

(57) ABSTRACT

A coffee machine is described. The coffee machine has a removable coffee vessel for fitting to a docking area. A closing piston is driven laterally relative to the coffee vessel into a side opening of the coffee vessel. The closing piston has a water delivery channel leading to its end face.

16 Claims, 6 Drawing Sheets

(56)                 References Cited

U.S. PATENT DOCUMENTS

| 5,957,033 | A | * | 9/1999 | In-Albon | ............ | A47J 31/4403 |
| | | | | | | 99/290 |
| 7,717,027 | B2 | * | 5/2010 | Sato | .................... | A47J 31/3638 |
| | | | | | | 99/287 |
| 8,146,485 | B2 | * | 4/2012 | Ozanne | ................. | A47J 31/407 |
| | | | | | | 99/283 |
| 8,402,882 | B2 | * | 3/2013 | De' Longhi | ........ | A47J 31/3614 |
| | | | | | | 99/289 R |
| 8,479,640 | B2 | | 7/2013 | Gavillet et al. | | |
| 8,973,488 | B2 | * | 3/2015 | Larzul | ................. | A47J 31/3623 |
| | | | | | | 99/302 R |
| 9,125,519 | B2 | | 9/2015 | Goeltenboth et al. | | |
| 10,537,203 | B2 | * | 1/2020 | Van Boxtel | ............ | A47J 31/36 |
| 2006/0254428 | A1 | | 11/2006 | Glucksman et al. | | |
| 2010/0083844 | A1 | * | 4/2010 | Budweg | .............. | A47J 31/3614 |
| | | | | | | 99/289 R |
| 2014/0356502 | A1 | | 12/2014 | Goeltenboth et al. | | |
| 2018/0042423 | A1 | | 2/2018 | Ceotto et al. | | |

FOREIGN PATENT DOCUMENTS

| CN | 104244779 | A | 12/2014 |
| CN | 107529909 | A | 1/2018 |
| DE | 4212288 | A1 | 10/1993 |
| EP | 2811876 | B1 | 1/2016 |
| JP | 5877165 | B2 | 3/2016 |
| WO | 9110391 | A1 | 7/1991 |
| WO | 2009/043630 | A2 | 4/2009 |
| WO | 2014037495 | A1 | 3/2014 |

OTHER PUBLICATIONS

International Search Report issued in connection with corresponding Application No. PCT/EP2020/087848 dated Feb. 2, 2021.

* cited by examiner

COFFEE MACHINE

CROSS-REFERENCE TO RELATED APPLICATIONS

The present application is a U.S. National Phase application under 35 U.S.C. § 371 of International Application No. PCT/EP2020/087848, filed on Dec. 24, 2020, which claims the benefit of European Patent Application No. 19219835.6, filed on Dec. 27, 2019. These applications are hereby incorporated by reference herein.

FIELD OF THE INVENTION

This invention relates to coffee machines, such as espresso coffee machines.

BACKGROUND OF THE INVENTION

It is well known that coffee made from freshly ground beans gives better quality than pre-ground coffee. Often, fresh beans are used when making espresso coffee.

There are many different types of commercially available espresso coffee machine, for use in the home, or in bars, restaurants and hotels. The type of machine which is appropriate in a particular setting for example depends on the amount of use, and the budget. In a manual espresso machine, a user fills a coffee receiving vessel, known as a portafilter, with coffee grounds. The user then needs to tamp the coffee grounds within the portafilter with sufficient pressure, such as around 200 N, to create a so-called puck. The portafilter is then mounted to the coffee machine, usually via a bayonet type of connection. Next, the coffee machine drives hot water through the puck in the portafilter and the resulting coffee is dispensed via a spout that is typically integrated in the portafilter. After brewing, the user needs to disconnect and empty the portafilter, throwing away the used coffee grounds.

In a bar setting, the manual process is conducted by the barista. In a domestic setting, the manual steps of the process make the user feel more involved in the coffee making process, and hence give the feeling of performing the role of a barista.

There are also manual espresso machines with an integrated grinder. A user switches the portafilter between a first position where it receives ground coffee and a second position where coffee is brewed. Tamping may be done manually or via a manually operated lever.

In a fully automatic espresso machine, all of the above-mentioned steps are done automatically, in one and the same machine. The machine comprises a bean container and a grinder, to make the coffee grounds. These grounds are transported into a brew chamber and tamped automatically, via a piston that may be hydraulically actuated or actuated via an electromotor. Next, hot water is driven through the coffee grounds in the brew chamber, coffee is brewed and dispensed, and the used coffee grounds are discharged from the brew chamber into a waste bin within the machine.

This removes the manual steps required by a manual espresso machine and hence saves time, as well as ensuring more uniform results.

A manual espresso machine can be produced at lower cost than a fully automatic espresso machine, since many of the transporting steps do not need to be automated. However, the results may be less uniform, as a result of the user involvement in the filling and tamping process, in particular the user involvement in setting the volume or weight of coffee grounds, and the force and uniformity (straightness) of tamping of the coffee grounds into a puck. A manual espresso machine needs little maintenance since there is much less waste water in the drip tray, and the coffee puck is removed after every brew by the consumer as part of the brewing process.

A fully automatic machine gives more consistent results, but is more costly. It also removes the barista feel of using a manual espresso machine. The coffee machine also needs a fair amount of maintenance (filling of coffee beans, water filing, removing waste water and getting rid of the coffee waste in a container) and generally is bigger than a manual espresso machine.

A third type of espresso coffee machine has been proposed, which combines elements from the two types described above. This is described in this document as a hybrid design.

For example, U.S. Pat. No. 9,125,519 discloses a coffee machine with a removable portafilter as used in a manual espresso machine, but which also includes a bean container and a coffee mill for delivering coffee grounds to an inserted portafilter. The portafilter functions as the brewing chamber, and a distribution filter (forming a plunger) is used for automatically tamping and thereby compacting the coffee grounds in the portafilter before pressurized hot water is delivered to the portafilter.

This hybrid design thus combines elements from a manual espresso machine and a fully automatic espresso machine. In this type of machine, the user thus only needs to connect the empty portafilter to the machine. The grinding, dosing of the ground coffee in the portafilter, tamping of the ground coffee, hot water delivery and coffee dispensing is then automated as in a fully automated machine. After brewing, the user needs to disconnect the portafilter and discharge the coffee waste, similarly to the way a manual espresso machine is used.

There are also capsule based coffee machines as mentioned above, in which water is driven through the contents of a capsule, after a capsule (base and cover) has been pierced. This type of machine does not create freshly ground coffee and there is only delivery of pressurized water rather than physical tamping of the coffee. However, this enables an even lower cost machine. In particular, there is no need for a dosing arrangement or grinder and there is a simple waste handling process. It is also easy to switch between different bean types.

These various different coffee machine designs all have different hydraulic circuits and components, so that economies of scale, based on shared components, are difficult to achieve when producing a suite of different coffee machine designs.

SUMMARY OF THE INVENTION

The invention is defined by the claims.

Examples in accordance with a first aspect provide a coffee machine, comprising:
- a main housing comprising a docking area accessible from the exterior of the machine;
- a coffee vessel for removable fitting to the docking area of the main housing;
- a water heater;
- a water delivery system for delivering heated water to the coffee vessel;
- a closing piston having an end face and a water delivery channel leading to the end face, forming part of the water delivery system; and a drive mechanism for providing lateral relative displacement between the closing piston and the coffee vessel, wherein the coffee vessel comprises an opening for receiving the closing piston and an outlet for delivering brewed coffee, wherein the coffee vessel is adapted to be fitted to the docking area with the opening facing sideways.

This coffee machine has an external, removable, coffee vessel and has a closing piston for closing the opening of the coffee vessel (which may be automatic or manual). The closing piston and coffee vessel are driven laterally relative to each other such that the closing piston enters a side opening of the coffee vessel. This lateral orientation of the coffee vessel opening and lateral relative movement of the closing piston can advantageously be used in different machine types.

It may be used in manual or hybrid machines as discussed above. In such cases, the coffee vessel is for receiving ground coffee. The coffee grounds may for example be delivered to the coffee vessel internally (e.g. from a grinder). After closing the coffee vessel to form a brew chamber, the same closing piston used for closing the coffee vessel can be used as a tamping piston, to compact the ground coffee.

It may further be used in a capsule type of machine as discussed above. In such cases, the coffee vessel is for receiving a capsule filled with coffee grounds. The capsule is directly placed in the coffee vessel by the user. After closing the coffee vessel, the same piston used for closing the coffee vessel can now be used to pierce the capsule, simply by equipping the closing piston with suitable piercing means.

The coffee vessel is insertable into the docking area and removable from the docking area by the user, so the coffee vessel can be considered to be an external part of the coffee machine. By this is meant that it can fitted to and removed from the main body of the coffee machine manually, and without any tools. The insertion and removal of the coffee vessel is a normal part of the process of the user in operating the coffee machine.

Thus, many different types of machine (manual, automatic, hybrid or capsule-based) may share common parts thereby reducing the cost of the overall set of components for the multiple types of machine.

The opening is for example at one side of the coffee vessel and the outlet is at an opposite side of the coffee vessel. Thus, there is a flow horizontally through the coffee vessel.

In a first arrangement, the drive mechanism comprises a manual lever. This provides a lowest cost approach, as well as giving the user a greater feeling of involvement in the coffee making process.

In a second arrangement, the drive mechanism comprises an electric motor. This may be more compact than a lever-based system but typically at an increased cost.

In a third arrangement, the drive mechanism comprises a hydraulic drive arrangement. This may make used of an existing pump of the coffee machine for example used to deliver water to the coffee vessel.

One option, as mentioned above, is that the coffee vessel is for receiving ground coffee capsules, i.e. capsules or pods filled with ground coffee, typically for one or two servings. The closing piston may then comprise a capsule piercing head.

Alternatively, the coffee vessel is for receiving ground coffee, wherein the coffee machine further comprises a coffee bean reservoir. A grinder is then provided having a ground coffee outlet which is directed to the coffee vessel.

This provides an integrated grinder, and thus forms a hybrid type design as explained above. The closing piston may then comprise a tamping piston.

The coffee machine for example then comprises a controller, which is adapted to control:

the heating of water;

the grinding of coffee beans;

the dosing of ground coffee to the coffee vessel; and the delivery of hot water.

Most of the processing is in this case automated, but there is manual insertion and removal of the coffee vessel. The tamping process may be manual or it may also be under the control of the controller.

The closing piston is for example actuatable between a first position relative to the coffee vessel in which the coffee vessel and the closing piston are spaced apart and there is a ground coffee chute between them, and a second position relative to the coffee vessel in which the closing piston extends into the coffee vessel.

In this design, ground coffee is delivered to the space between the coffee vessel and the closing piston, and the ground coffee is then urged into the coffee vessel and compacted by the action of the closing piston. In the second position, the closing piston for example blocks the ground coffee chute. Thus, there is no passage for unwanted additional ground coffee to reach the brewing area.

The coffee vessel for example comprises a filter at the outlet.

Separate capsule-based and espresso machines are mentioned above. In another example, the coffee machine has an espresso mode and a capsule mode, wherein the coffee vessel is for receiving coffee grounds in the espresso mode and for receiving a coffee capsule in the capsule mode. The closing piston may then comprise a retractable piercing unit so that it can function as a tamping piston or as a piercing piston.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
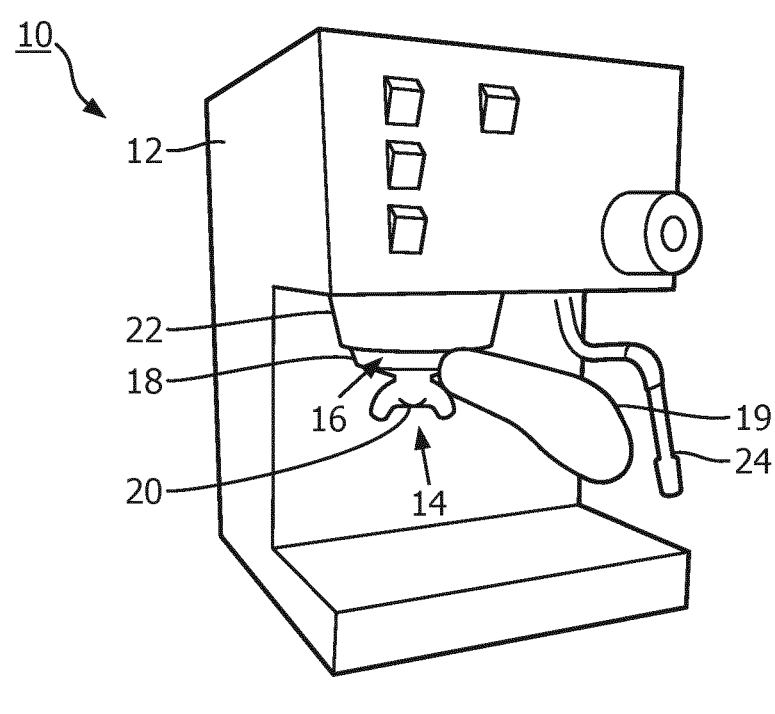
FIG. 1 shows the general design of a coffee machine to which various embodiments may be applied.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a coffee machine having a removable coffee vessel for fitting to a docking area. This fitting and removal is performed by the user. A closing piston is driven relative to the coffee vessel laterally into a side opening of the coffee vessel. The closing piston has a water delivery channel leading to its end face. Thus, the water delivery to the interior of the coffee vessel is in a lateral direction.

This lateral (i.e. horizontal) orientation of the coffee vessel corresponds to the typical orientation of a capsule in a capsule-based machine. By providing a removable coffee vessel, this orientation may be used not only for a capsule-based machine but may also be used for hybrid and manual coffee machines in which fresh ground coffee is provided to the coffee vessel. Thus, a set of different machine types can make use of a set of shared parts and architecture, with minimal adjustment.

The invention is thus based on the recognition that different machine types have in common that a vessel in which the coffee is housed needs to be closed so as to form a brew chamber. In a hybrid and manual coffee machine in which the coffee vessel houses freshly ground coffee, this closing mechanism can furthermore be used to tamp the coffee grounds.

In a capsule-based machine, the closing mechanism can be used to pierce one side of the capsule (typically, its base). Water may then be driven through the coffee grounds inside the capsule (which now functions as the brew chamber) via the same closing mechanism.

Thus, the invention is based on the recognition that the main architecture for all these different types of machines can be the same. Only minimal adjustments may be needed to the closing mechanism such as adding a piercer in the case of a capsule-based machine, and optionally adjusting the stroke of the closing mechanism. These adjustments may be implemented as control changes rather than hardware changes.

FIG. 1 shows the general design of a first example of a coffee machine to which the invention may be applied. The example of FIG. 1 may be a manual espresso machine or a hybrid espresso coffee machine, depending on how the grinding and tamping are performed.

The coffee machine 10 comprises a main housing 12 having a docking area 14 accessible from the exterior of the machine. The docking area may thus be considered to be an external interface to the coffee machine. The docking area 14 is for receiving a coffee vessel 16. This is generally termed a portafilter for manual coffee machines.

A typical portafilter has a support body 18, a handle 19 and a lower spout 20. It connects to a group head 22, for example with a bayonet coupling. The portafilter includes a filter or filter basket. FIG. 1 also shows a steam nozzle 24.

The term "coffee vessel" is used generally to denote the container to which ground coffee is delivered and subsequently brewed. The ground coffee may be delivered in a capsule or released from a capsule or delivered from a grinder. The term coffee vessel is intended to cover all of these possibilities, depending on the type of machine being referred to.

FIG. 1 shows the conventional arrangement of a portafilter, which is mounted in a horizontal orientation and connected to a vertically extending group head.

This invention provides an alternative design of the removable coffee vessel so that it has a different design to that shown in FIG. 1. In particular, instead of having an open top (when fitted to the coffee machine) it has an open side.

Figures 2, 3:
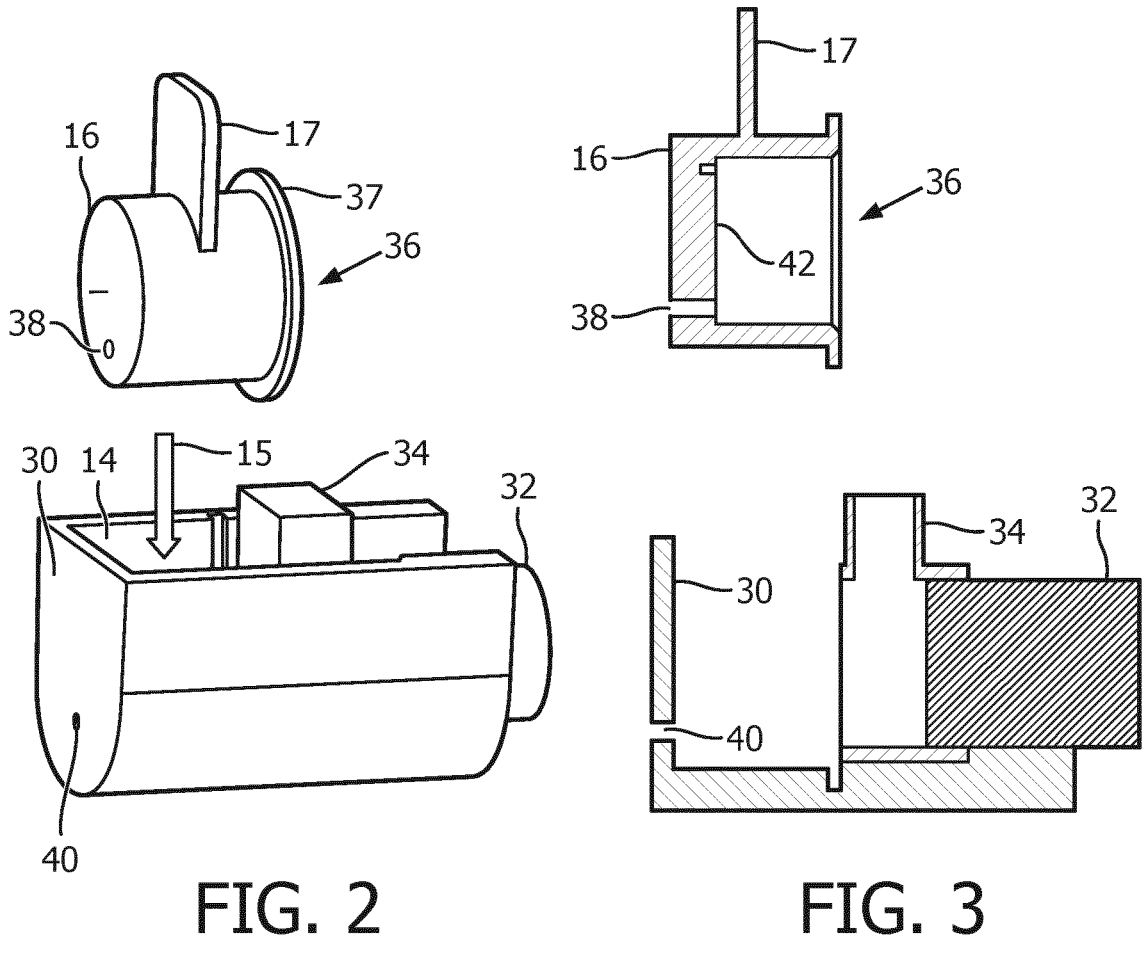
FIG. 2 shows an example of the coffee vessel and the docking area.
FIG. 3 shows a cross section through the coffee vessel and housing.

FIG. 2 shows how the invention may be applied to a coffee machine which has tamping of coffee grounds. It shows an example of the coffee vessel 16 and the docking area 14. The coffee vessel 16 is insertable into and removable from the docking area 14 as shown by arrow 15. The coffee vessel has a handle 17 to enable user manipulation.

An opening of the docking area may be exposed to the exterior of the coffee machine, but equally it may be covered by a lid. However, in all cases, the docking area, or at least an access region of the docking area, is accessible to the user without any disassembly of the coffee machine, and the insertion and removal of the coffee vessel is intended to be performed by the user prior to, and subsequently after, each brew session, or in other words each time a coffee drink is to be prepared. Thus, the coffee vessel is for storing a quantity of the coffee grounds for one brew session.

The docking area 14 is formed by a housing 30. One end of the housing 30 has an upper opening which defines the docking area, and in particular an access region which allows insertion and removal of the coffee vessel. The opposite end of the housing 30 supports a closing piston 32 which is driven laterally i.e. in a horizontal direction when the coffee machine is mounted in its normal operating orientation. The closing piston is designed according the functionality of the machine. In the example shown, in which the coffee machine supports tamping of coffee grounds to make an espresso coffee drink, it may be a tamping piston for tamping loose coffee grounds. In other examples, it may be a piercing piston for piercing a coffee capsule which is held in the coffee vessel and for delivering hot water to the coffee capsule.

In this example, between the closing piston 32 and the docking area is a ground coffee chute 34. Ground coffee is delivered from the chute to the interior volume of the coffee vessel. For this purpose, the coffee vessel 16 has an opening 36 at one lateral side (when the coffee vessel has the orientation in which it is received by the coffee machine). This opening is sized to be closed by, and preferably receive, the closing piston 32. In the illustrated embodiment, there is a rim 37 around the opening which engages with a slot in the housing 30 to provide accurate alignment of the coffee vessel and housing, such that the opening is aligned with the closing piston. Of course, other suitable alignment means may be provided at the coffee vessel 16 and/or in the housing 30.

At an opposite lateral side, there is a coffee outlet nozzle 38 from which brewed coffee is dispensed. The housing 30 has a corresponding output nozzle 40, with the two nozzles 38, 40 aligned.

The coffee vessel is received vertically in the docking area 14 in the example shown.

FIG. 3 shows a cross section through the coffee vessel 16 and housing 30.

There is a filter associated with the output nozzles 38, 40. This may be a filter layer 42 inside the coffee vessel as shown, or it may be between the coffee vessel and the housing (or even on the outside of the housing).

FIGS. 4 to 7 show the different stages of a brewing cycle for brewing an espresso coffee drink.

Figure 4:
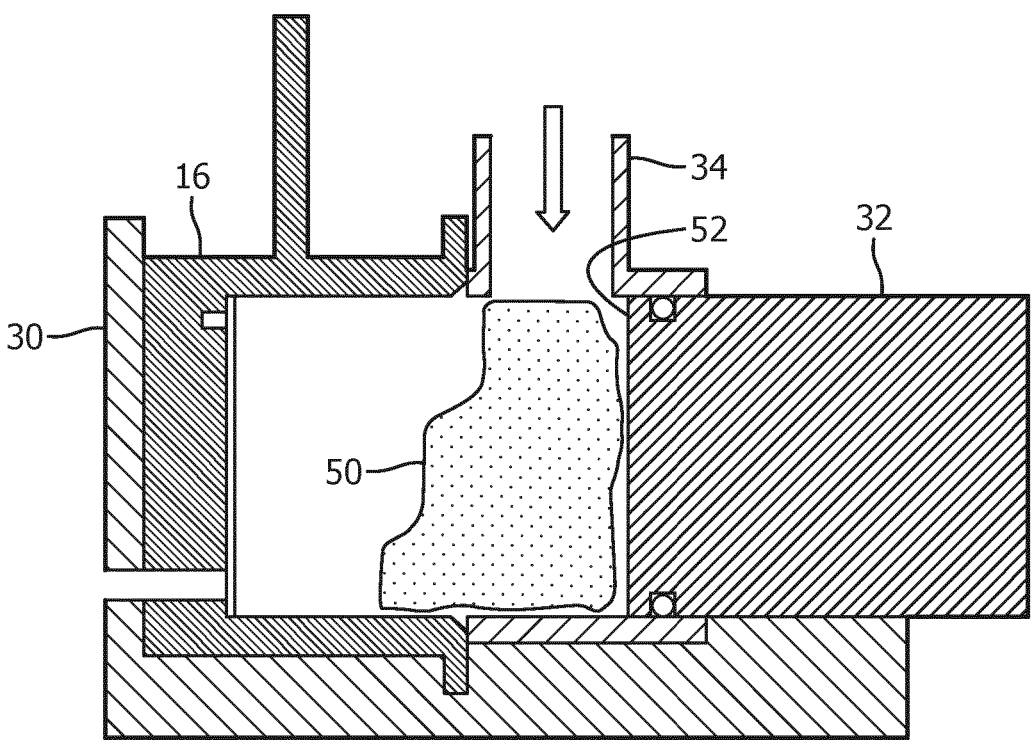
FIGS. 4 to 7 show the different stages of a brewing cycle.

In FIG. 4, ground coffee 50 is received from the ground coffee chute 34 to the space between the piston and the coffee vessel 16. The coffee flows partially into the coffee vessel and remains partly in the space.

Figure 5:
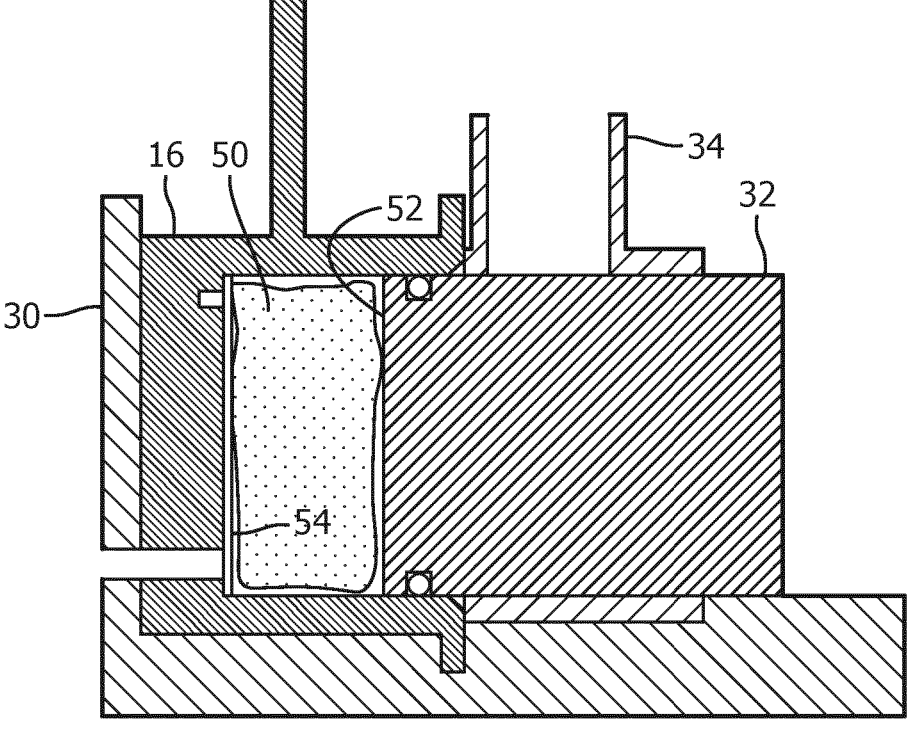

In FIG. 5, the piston 32 is advanced, to close the opening 36 of the coffee vessel, and chute 34. The piston movement further helps compacting the ground coffee in a horizontal direction between an end face 52 of the closing piston 32 and an opposing end face 54 of the coffee vessel. The filter 42 prevents dry coffee grounds escaping from the output nozzles 38, 40.

Figure 6:
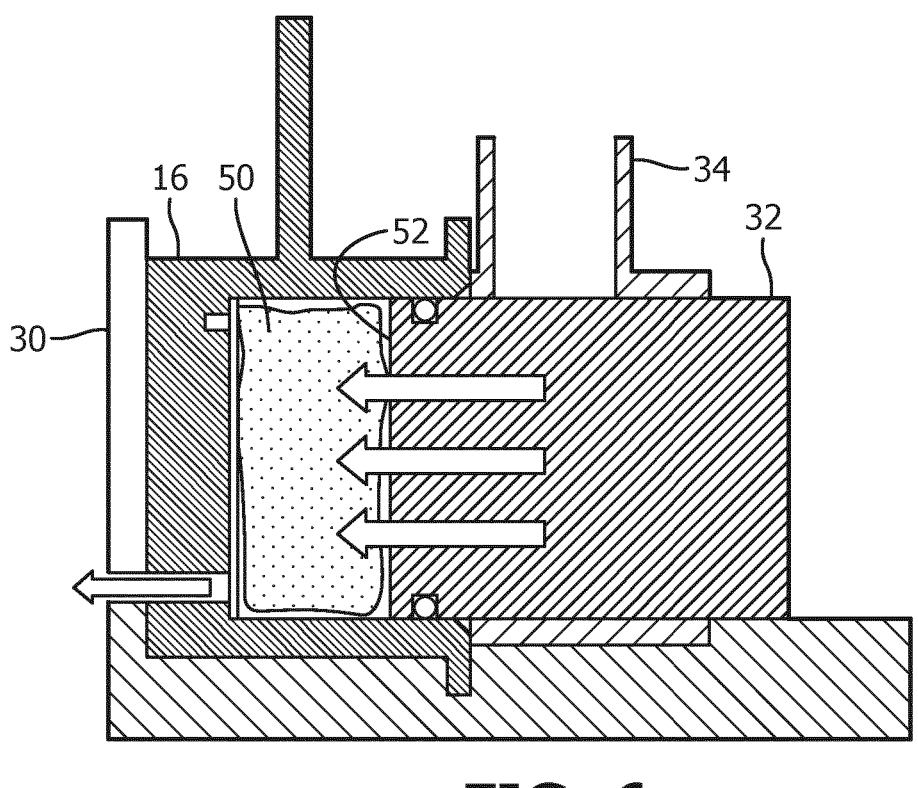

In FIG. 6, hot water is delivered through one or more channels in the closing piston 32 into the coffee vessel and through the compacted ground coffee 50. The brewed coffee is delivered through the aligned output nozzles 38, 40. The water flow is thus generally laterally i.e. horizontally through the compacted coffee grounds.

The channels in the closing piston may deliver water to a set of locations as shown to provide a distributed supply of hot water under pressure.

Figure 7:
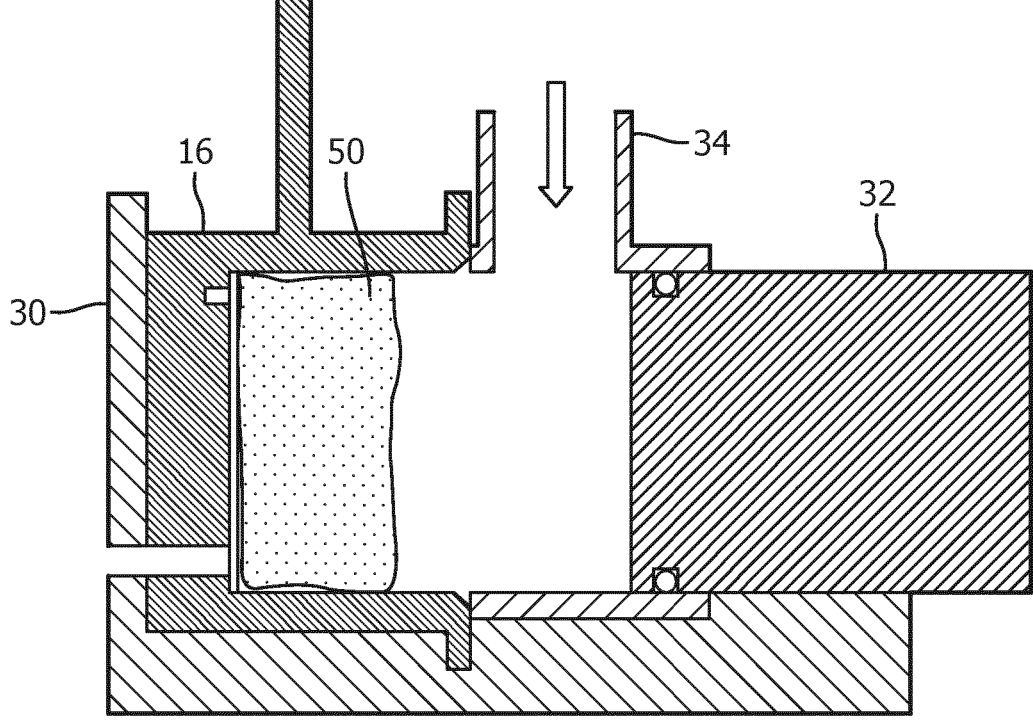

In FIG. 7, brewing is complete so the water delivery is halted and the closing piston is retracted.

The user then removes the coffee vessel 16 for cleaning. The filter 42 may be cleaned or replaced.

This example is based on the supply of ground coffee to the coffee vessel from inside the coffee machine. For this purpose, the coffee machine has a reservoir for coffee beans and a grinder. The coffee beans may be supplied loose or in capsules, in which case the capsules are emptied into the grinder as part of the coffee making process. In such a case, metering of the ground coffee may be simplified in some designs in that all of the beans from a capsule may be provided to the grinder. However, a larger capsule of coffee beans may instead be provided, and the delivery of coffee beans from the larger capsule to the grinder may still be metered.

The same coffee vessel and tamping arrangement designs may be used for these two options.

The same coffee vessel design may also be used in a coffee machine design for receiving already-ground coffee in capsules. In this more simple type of machine, there is no tamping process. The closing piston 32 serves to close the coffee vessel and may further be provided with a water delivery piercing head to pierce the capsule, through which the hot water is delivered.

The brewed coffee leaves the capsule at the opposite side. The opening 38 of the coffee vessel may for example be provided with a projecting edge that causes the other side of the capsule to become pierced once the built-up (water) pressure inside the capsule becomes high enough The architecture of the coffee vessel described above can indeed be similar or largely similar to that used in the embodiments shown in FIGS. 2 to 7, where loose coffee grounds are loaded into the coffee vessel via chute 34. The piston 32 then instead of compacting the coffee grounds, pierces the capsule, but without compressing the capsule. It may for example simply have a different end face when used in this type of machine.

Another option is to use a soft pod, including ground coffee encapsulated in soft filter material, that fits into the coffee vessel. A tamping process may still be performed with the closing piston compressing the soft pod.

The ground coffee chute may also be designed so that instead of receiving ground coffee from a grinder, it may receive a coffee pod or capsule. Thus, the machine may be loaded with a magazine of coffee pods or capsules. The lateral movement of piston 32 may then be used to transport the coffee pod or capsule to the coffee vessel.

Alternatively, a separate mechanism may be used for delivering capsules down the chute to the coffee vessel. In such cases, the user only needs to dispense the used coffee pod or capsule, and can load the machine with multiple pods or capsules.

A machine could also be designed with both options, i.e. for grinding coffee beans and delivering coffee grounds to the coffee vessel or delivering a coffee pod or capsule to the coffee vessel.

In all cases, the coffee machine contains a hydraulic circuit which provides fluid couplings between a water supply (typically a water reservoir), an internal water heater and a water delivery system for delivering heated water to the coffee vessel.

Figure 8:
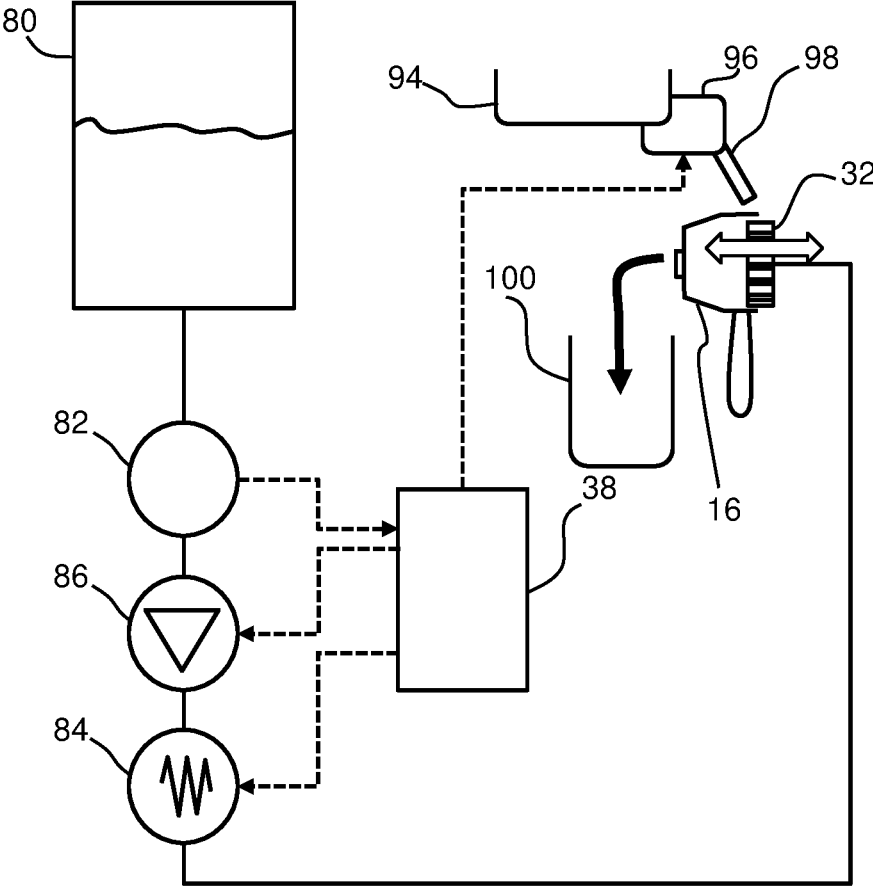
FIG. 8 shows one example of the hydraulic circuit used in the coffee machine.

FIG. 8 shows one example of the hydraulic circuit.

FIG. 8 shows a water reservoir 80, a flow meter 82 (for flow rate and dosing control), a water heater 84, and a water pump 86. The flow meter provides a flow measurement to a controller 38, and the controller 38 controls the heater and pump to perform the coffee brewing process. The water heater is typically a flow through heater, such as a thermo-block or in-line flow heater.

A water delivery system comprises a fluid passage for heated and pumped water to the piston 32 for delivering heated water to the coffee vessel 16. The piston for example provides an area of water delivery to the ground (and compacted) coffee to provide a more uniform brewing of the ground coffee.

FIG. 8 also shows a bean container 94 and a coffee grinder 96 having a ground coffee outlet 98. FIG. 8 thus shows a hybrid type design, with an internal coffee grinder but external brew chamber (i.e. the coffee vessel 16). Brewed coffee is delivered from the vessel 16 to a coffee receptacle 100.

As mentioned above, the actuation of the piston may 32 be performed by a mechanical lever for manual operation by the user, or by a hydraulic actuator (which may for example use the pump 86 as the pressure source) or by an electric motor. Thus, the closing of the coffee vessel, and subsequent tamping of the coffee ground may be under the control of the controller 38 or it may be a manual process.

Figure 9:
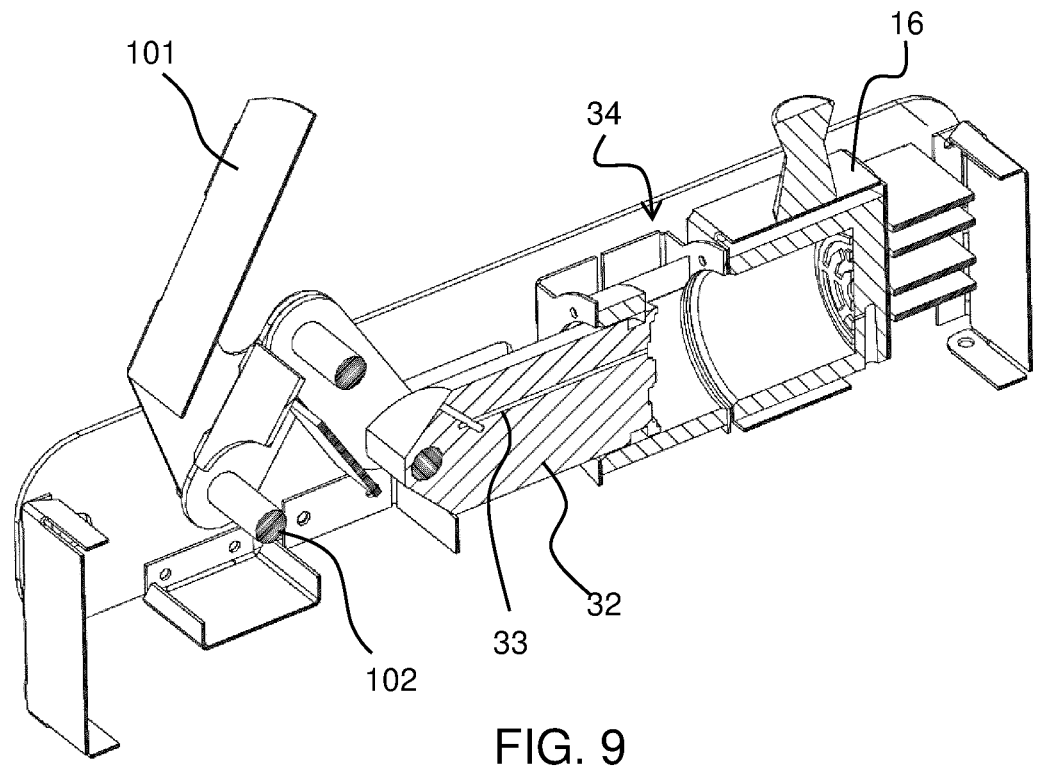
FIGS. 9 and 10 show an example of a mechanical lever design in cross section.
Figure 10:
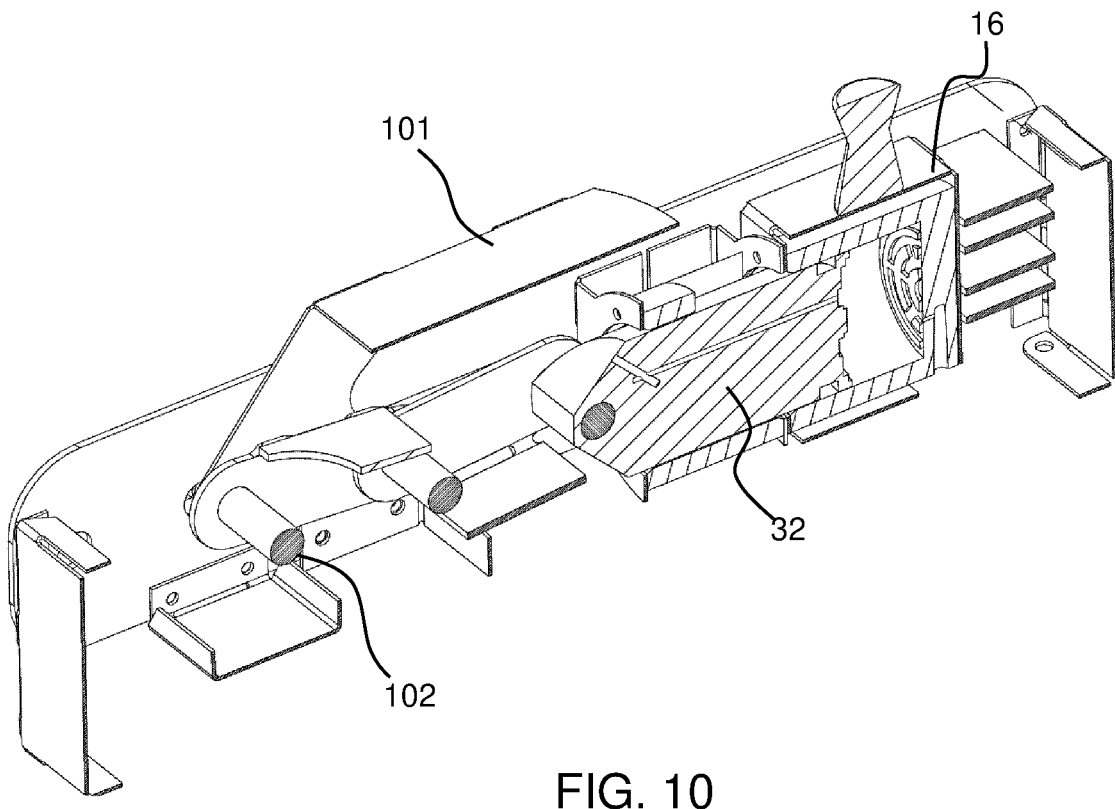

FIGS. 9 and 10 show an example of a mechanical lever design in cross section. The piston 32 is driven forwards and backwards by a lever 101 which pivots about a pivot axis 102. An arm arrangement converts the lever rotation to a linear reciprocation of the piston 32. A water delivery channel 33 in the piston, leading to an end face of the piston, is also shown.

FIG. 9 shows a first, open, position. The coffee vessel 16 and the piston 32 are spaced apart and the ground coffee chute 34 is between them. Ground coffee can thus be dispensed to a location adjacent the side opening of the coffee vessel 16 and also in the coffee vessel.

FIG. 10 shows a second, closed, position in which the piston is linearly displaced into the coffee vessel. This pushes the ground coffee into the coffee vessel and provides compacting of the ground coffee. The piston has passed and therefore blocks the ground coffee chute.

Figure 11:
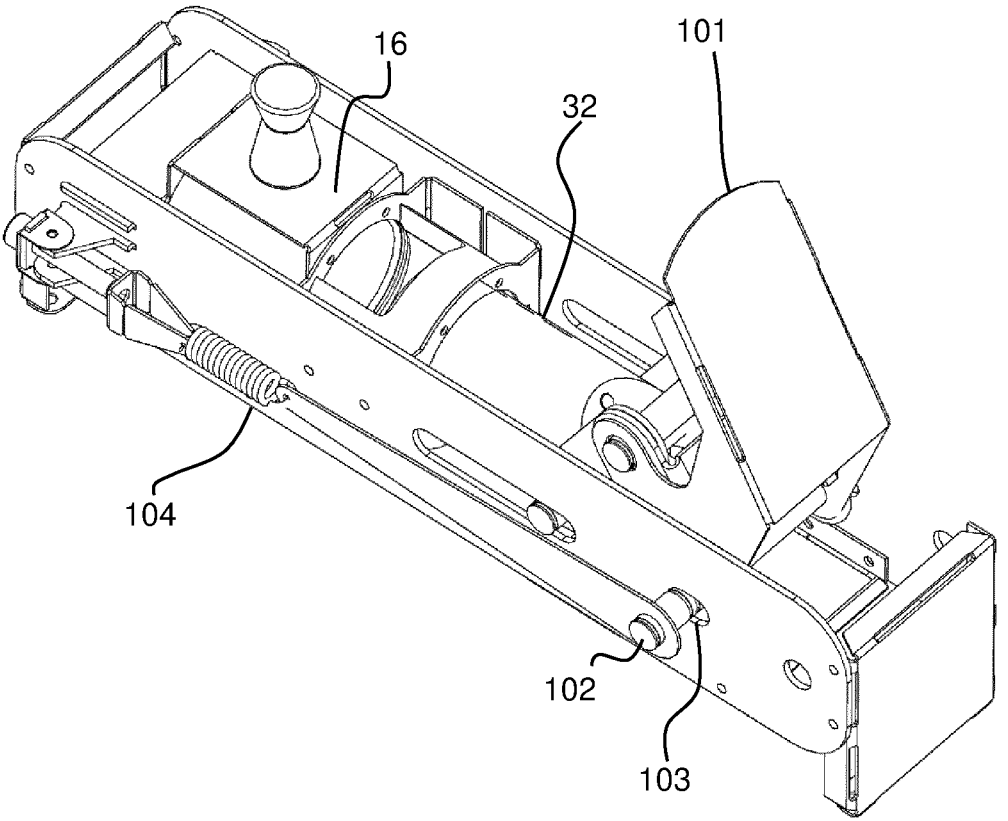
FIG. 11 shows the mechanical lever design in perspective view.

FIG. 11 shows the mechanical lever design in perspective view. A spring 104 is used to pull the piston towards the coffee bed in the coffee vessel. It allows the piston to exert sufficient tamping force with various amounts of coffee in the coffee vessel. Thus, there is a range of positions of the piston allowed, even when the lever is in the closed position, resulting from the slot 103 which houses the pivot axis. The spring 104 pulls the pivot axis along the slot 103, and hence pulls the piston and the entire mechanical lever design, towards the coffee vessel.

In the example above, the piston is driven towards the coffee vessel. However, the coffee vessel may instead be driven towards a fixed piston. For example, the coffee vessel and its housing 30 may be driven laterally. The result is the same, of relative lateral movement between the closing piston and coffee vessel.

It has been described above how different machine types are able to share more components and have part of their architecture shared. It is also possible for multiple options to be integrated into a single machine. For example, a common design may be configured for use with capsules by advancing a piercer of the closing piston (as a user-selected function) and the piercer may be retracted when not using capsules.

Instead of a retractable piercer, it may be possible to design the espresso machine such that the piercer is always present, in that it will not detract from the function of compacting the loose ground coffee.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A coffee machine, comprising:
   a main housing comprising a docking area accessible from an exterior of the coffee machine;
   portafilter for removable fitting to the docking area of the main housing;
   a water heater;
   a water delivery system for delivering heated water to the portafilter;
   a closing piston having an end face and a water delivery channel leading to the end face, forming part of the water delivery system; and
   a drive mechanism for providing lateral relative displacement between the closing piston and the portafilter,
   wherein the portafilter comprises an opening for receiving the closing piston and an outlet for delivering brewed coffee, and wherein the portafilter is adapted to be removed from and fitted to the docking area, after each brew session, with the opening facing sideways.

2. The coffee machine of claim 1, wherein the opening is at one side of the portafilter and the outlet is at an opposite side of the portafilter.

3. The coffee machine of claim 1, wherein the drive mechanism comprises a manual lever.

4. The coffee machine of claim 1, wherein the drive mechanism comprises an electric motor.

5. The coffee machine of claim 1, wherein the drive mechanism comprises a hydraulic drive arrangement.

6. The coffee machine of claim 1, wherein the portafilter is for receiving ground coffee capsules.

7. The coffee machine of claim 6, wherein the closing piston comprises a capsule piercing head.

8. The coffee machine of claim 1, wherein the portafilter is for receiving ground coffee, and wherein the closing piston comprises a tamping piston.

9. The coffee machine of claim 8, wherein the coffee machine further comprises:
   a coffee bean reservoir or a coffee bean capsule holder; and
   a grinder having a ground coffee outlet which is directed to the portafilter.

10. The coffee machine of claim 9, comprising a controller, which is adapted to control:
    heating of water;
    grinding of coffee beans;
    dosing of ground coffee to the portafilter; and
    the delivery of the heated water.

11. The coffee machine of claim 1, wherein the closing piston and the portafilter are actuatable between a first relative position in which the portafilter and the closing piston are spaced apart and there is a ground coffee chute between them, and a second relative position in which the closing piston extends into the portafilter.

12. The coffee machine of claim 11, wherein, in the second relative position, the closing piston blocks the ground coffee chute.

13. The coffee machine of claim 1, wherein the portafilter comprises a filter at the outlet.

14. The coffee machine of claim 1, wherein the coffee machine has an espresso mode and a capsule mode, and wherein the portafilter is for receiving coffee grounds in the espresso mode and for receiving a coffee capsule in the capsule mode.

15. The coffee machine of claim 14, wherein the closing piston comprises a retractable piercing unit.

16. The coffee machine of claim 1, wherein the main housing comprises an output nozzle aligned with the outlet.

* * * * *